J. W. ROOP.
CHURN.
APPLICATION FILED JAN. 21, 1911.
1,004,908.
Patented Oct. 3, 1911.
2 SHEETS—SHEET 1.
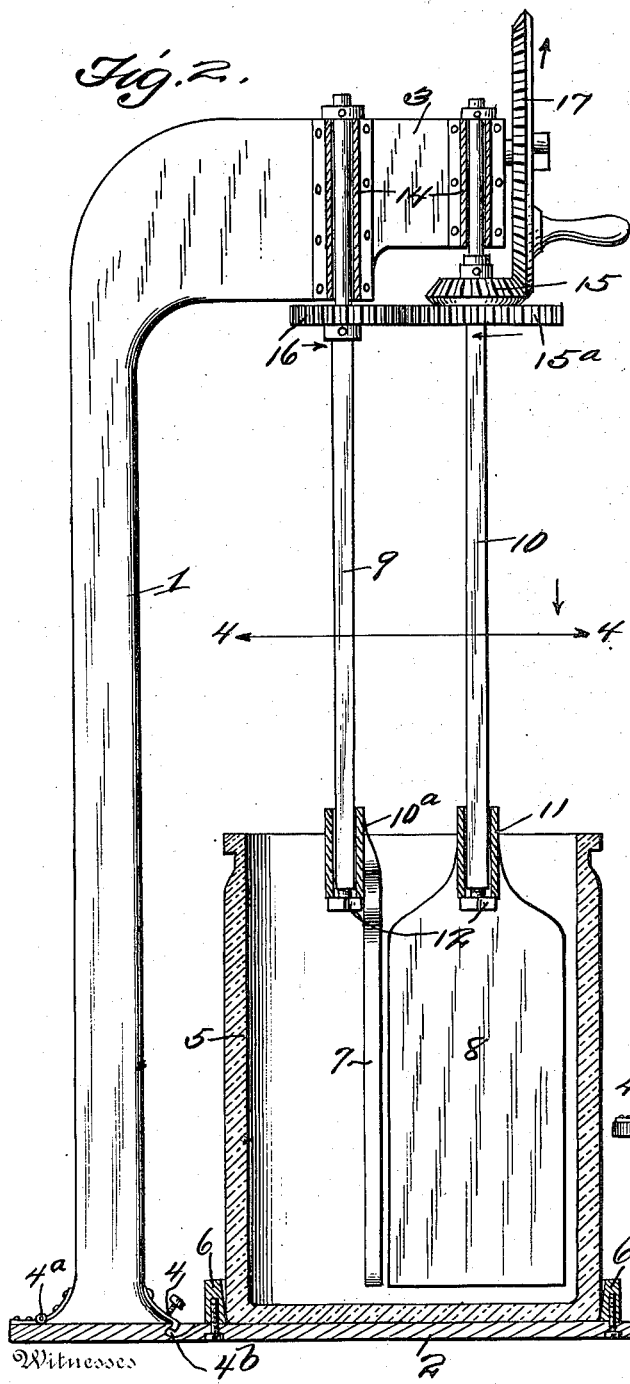
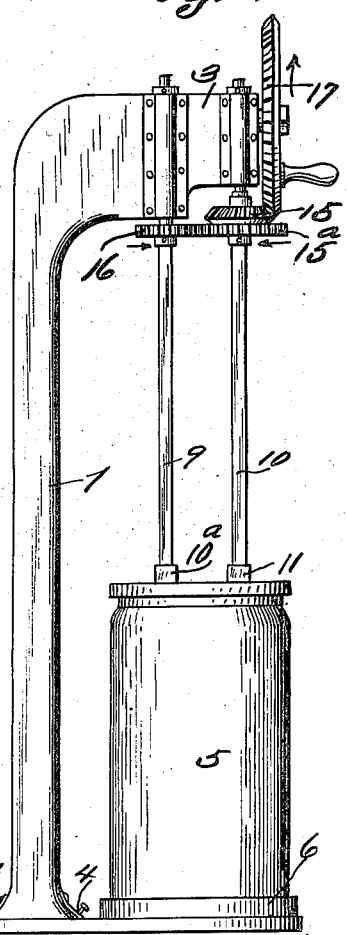
Inventor
J. W. Roop,
By D. Swift &C.
Attorneys

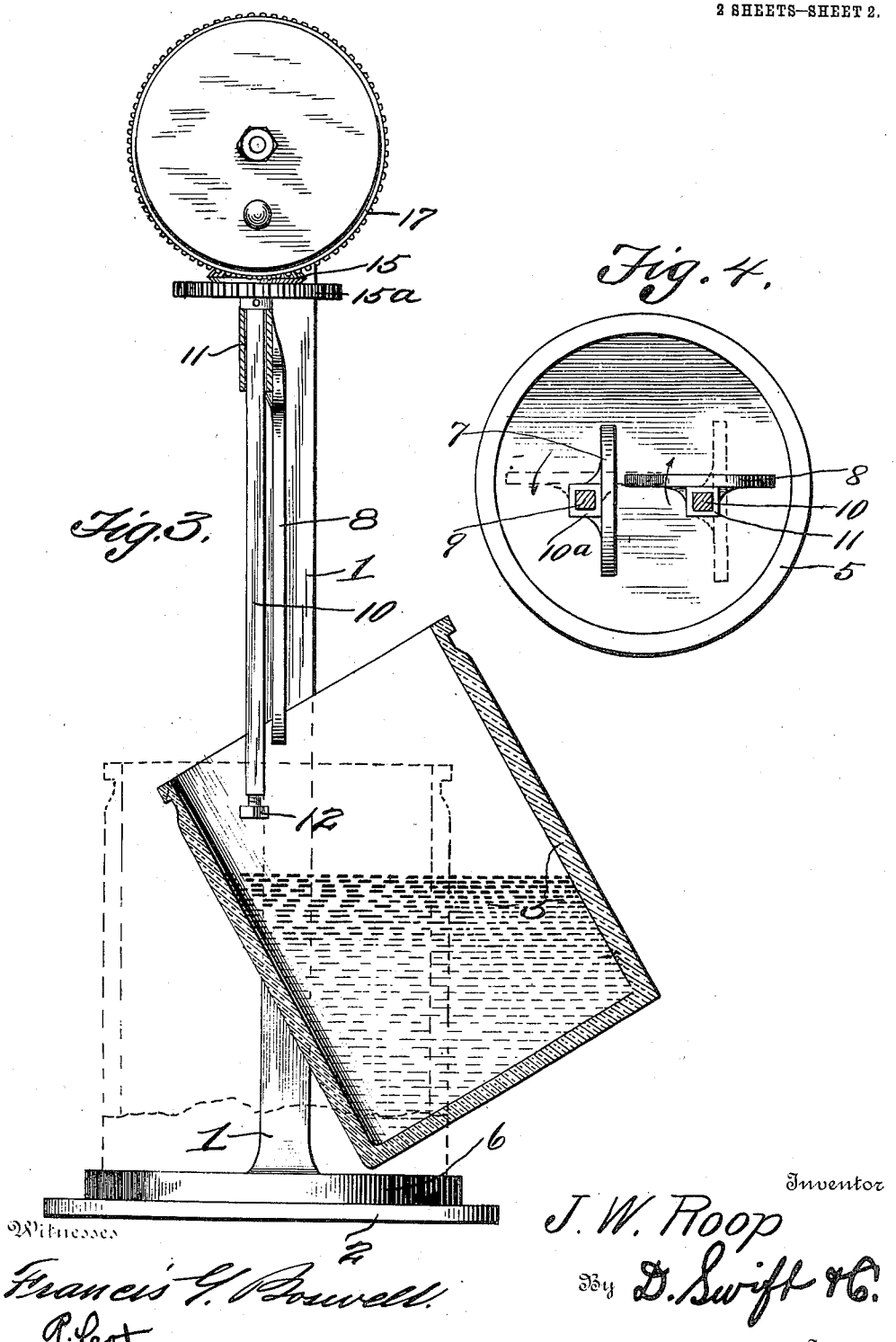

UNITED STATES PATENT OFFICE.

JOHN W. ROOP, OF APACHE, OKLAHOMA.

CHURN.

1,004,908.  Specification of Letters Patent.  Patented Oct. 3, 1911.

Application filed January 21, 1911. Serial No. 603,974.

*To all whom it may concern:*

Be it known that I, JOHN W. ROOP, a citizen of the United States, residing at Apache, in the county of Caddo and State of Oklahoma, have invented a new and useful Churn; and I do hereby declare the following to be a full, clear, and exact description of the invention, such as will enable others skilled in the art to which it appertains to make and use the same.

This invention relates to the art of churns, and it particularly pertains to a new and useful churn, in which there are involved various novel features of construction.

The main object of the invention is the provision of a pair of churning elements or dashers including means for imparting rotary movements to the elements, in order to rotate them in opposite directions. By this method cream may be rapidly churned, and in such a manner as to prevent the cream from being splashed up the sides of the cream container. It will be observed that the churning elements or dashers are arranged side by side in parallel relation.

A further object of the invention is to lessen the cost of manufacturing such devices.

A further object of the invention is to lessen the number of parts and elements of churns, so that the housewife, farmer or farmer's wife will have fewer parts to clean after churning, for example, the churning elements or dashers are the only elements to be cleaned after churning, by reason of the fact that the cream container (which may be the usual form of stone jar or other receptacle, which ordinarily holds the cream) holds the buttermilk after the butter is removed. The container with the buttermilk therein is then placed in the dairy.

A further feature of the invention is the provision of novel means for permitting the cream container to be inserted in place or removed.

In the drawings, however, there is only disclosed one form of the invention, but in practical fields this form may require alterations, to which the applicant is entitled, provided the alterations are comprehended by the appended claims.

The invention comprises further features and combination of parts hereinafter set forth, shown in the drawings and claimed.

In the drawings:—Figure 1 is a side elevation of a churn embodying the various features of the invention. Fig. 2 is a longitudinal vertical sectional view through the churn. Fig. 3 is a view similar to Fig. 2, showing the churning elements or dashers so arranged as to permit the cream container to be inserted in place or removed. Fig. 4 is a transverse sectional view on line 4—4 of Fig. 2.

As to the annexed drawings, 1 designates a standard, including a base 2 and a laterally extending upper portion 3. The portion 3 is arranged directly over and above the base 2. The base is so connected to the standard 1, as shown at 4$^a$, by means of a hinge, in order to permit the standard to be swung on the base, after having been released by disengaging the spring catch 4 from the recess 4$^b$ of the base. The object in swinging the standard 1 on its hinge is to permit the churning elements to be inserted in the cream container 5 (which may be the usual form of stone jar).

To hold the cream container 5 properly centered the base 2 is formed with an annular slightly upstanding flange 6, which encircles the lower portion of the container when in place. It will be observed that by the provision of this flange the container 5 is held centered, so that the churning elements 7 and 8 will rotate centrally therein.

The churning elements or dashers 7 and 8 are connected to their revoluble shafts or rods 9 and 10, as at 10$^a$ and 11, in such a manner as to permit them to be raised relatively with regard to the shafts, so that the cream container, may be inserted in place or removed. The revoluble shafts or rods are so connected to the churning elements as to permit the churning elements to rotate with them, as shown in Fig. 4. The lower ends of the shafts or rods 9 and 10 are provided with removable devices 12 for holding the churning elements upon the shafts or rods.

The upper portions of the shafts or rods 9 and 10 are rotatably mounted in bearings of the laterally extending portion of the standard, as shown at 14, and immediately below the bearings the shafts or rods are provided with gears 15 and 16. The gear 15 is in mesh with a gear 17, which is of larger diameter than either one of the gears 15 and 16 so as to impart rapid rotary motions to the churning elements. The gear 16 does not mesh with the gear 17, but is in mesh with the gear 15ª, so that when motion is imparted to the gear 15, thus rotating it in one direction, the gear 16 will be rotated in the opposite direction. By this method rapid rotary motions are imparted to the churn elements. The gear 17 is formed with a laterally projecting handle whereby the same may be rotated manually.

To operate the churn the usual form of stone jar with the cream therein is inserted in place, subsequently to raising the churning elements, after which the churning elements are again lowered, until they are entirely received within the jar. After the various parts are arranged as shown in Figs. 1 and 2, motion may be imparted to the gear 17, which in turn transmits motion to the churning elements by virtue of the gears 15 and 16.

The invention having been set forth, what is claimed as new and useful is:—

1. A churn embodying a standard having a laterally extending base, and provided with a laterally extending upper portion overhanging the base; revoluble shafts mounted in bearings of the overhanging portion, and including raisable churning elements rotatable with the shafts, members carried by the shafts engaging the churning elements to prevent them from scraping the bottom of a cream container; means for imparting opposite rotary movements to the shafts; a cream container into which the churning elements extend, the base including means to receive the cream container to hold the same centered relatively with regard to the churning elements.

2. In combination, a pair of oppositely revoluble shafts rectangular in cross section, a standard including a base and provided with an overhanging portion above the base, said shafts being mounted in bearings of the overhanging portion, means for revolubly operating the shafts in opposite directions, a pair of churning elements having offset integral sleeves correspondingly shaped relative to the shafts in cross section, so as to telescope thereon, thus making it possible to raise the churning elements to permit of the insertion of the cream container, and removable devices threaded into the lower end of the shaft for limiting the downward movement of the churning element, said removable devices acting as means for adjusting the churning elements in position relatively to the container.

In testimony whereof I have signed my name to this specification in the presence of two subscribing witnesses.

JOHN W. ROOP.

Witnesses:
FRED L. BURRESS,
J. T. CRAWFORD.